(12) United States Patent
Zhao et al.

(10) Patent No.: US 7,483,068 B2
(45) Date of Patent: Jan. 27, 2009

(54) RED EYE REMOVAL USER INTERFACE FOR A PORTABLE DEVICE

(75) Inventors: Bin Zhao, Hangzhou (CN); Kaixuan Mao, Milpitas, CA (US)

(73) Assignee: ArcSoft, Inc., Fremont, CA (US)

( * ) Notice: Subject to any disclaimer, the term of this patent is extended or adjusted under 35 U.S.C. 154(b) by 839 days.

(21) Appl. No.: 11/008,864

(22) Filed: Dec. 10, 2004

(65) Prior Publication Data

US 2006/0129950 A1   Jun. 15, 2006

(51) Int. Cl.
*H04N 3/14* (2006.01)
*H04N 5/217* (2006.01)
(52) U.S. Cl. .................................. 348/333.02; 348/241
(58) Field of Classification Search ............ 348/333.02, 348/241
See application file for complete search history.

(56) References Cited

U.S. PATENT DOCUMENTS

| | | | | |
|---|---|---|---|---|
| 5,596,346 | A * | 1/1997 | Leone et al. ................. | 345/667 |
| 7,035,462 | B2 * | 4/2006 | White et al. ................. | 382/167 |
| 7,359,003 | B1 * | 4/2008 | Knighton et al. ............ | 348/376 |
| 2004/0041924 | A1 * | 3/2004 | White et al. ................. | 348/239 |
| 2004/0109614 | A1 | 6/2004 | Enomoto et al. | |
| 2004/0160517 | A1 * | 8/2004 | Iida ........................ | 348/207.99 |
| 2005/0163498 | A1 * | 7/2005 | Battles et al. ............... | 396/158 |
| 2006/0117108 | A1 * | 6/2006 | Salisbury et al. ............ | 709/229 |

FOREIGN PATENT DOCUMENTS

EP    1 429 290 A2    6/2004

OTHER PUBLICATIONS

PCT International Search Report and Written Opinion of the International Searching Authority, 11 pages.
PCT Notification Concerning Transmittal of International Preliminary Report on Patentability, including Written Opinion of the International Searching Authority, 8 pages.
"HP in-camera red-eye removal," web page downloaded on Nov. 1, 2004 from http://h30022.www3.hp.com/hpoobe/us/R707/redeye_removal.asp; 2 pages.

* cited by examiner

*Primary Examiner*—Lin Ye
*Assistant Examiner*—Hung H Lam
(74) *Attorney, Agent, or Firm*—Patent Law Group LLP; David C. Hsia

(57) ABSTRACT

A method of a user interface for red eye removal in a portable device includes displaying a first screen having an image and a first menu. If a user selects a first icon in the first menu, the method further includes displaying a second screen having the image after automatic red eye removal and a second menu. If the user selects a second icon in the second menu, the method further includes redisplaying the second screen having the image prior to automatic red eye removal. If the user selects a third icon in the second menu, the method further includes displaying a third screen having the image, a visual indicator for the location of manual red eye removal, and a third menu. If the user selects a fourth icon in the third menu, the method further includes redisplaying the second screen with the image after manual red eye removal.

15 Claims, 3 Drawing Sheets

RED EYE REMOVAL USER INTERFACE FOR A PORTABLE DEVICE

FIELD OF INVENTION

This invention relates to a user interface for a portable device, and more specifically to a user interface for a red eye removal feature on a digital camera or a cell phone equipped with a camera.

DESCRIPTION OF RELATED ART

"Red eye" is a phenomenon where a person's pupils appear red in a photograph taken with a flash. Red eye comes from light reflecting off of the blood vessels in the retinas (on the back interior of the eyeballs). HP offers a R707 digital camera with automatic red eye removal. After the digital camera performs the automatic red eye removal, the user can choose to save the changes, view the changes, or cancel the changes. The R707 digital camera does not offer manual red eye removal.

One of the difficulties in incorporating features into a portable device is how to design an intuitive user interface based on the limited display and buttons provided on the device. Thus, what is needed is a user interface for accessing both automatic and manual red eye removal on a portable device such as a digital camera or a cell phone equipped with a camera.

BRIEF DESCRIPTION OF THE DRAWINGS

Use of the same reference numbers in different figures indicates similar or identical elements.

SUMMARY

In one embodiment of the invention, a method of a user interface for red eye removal in a portable device includes displaying a first screen having an image and a first menu. If a user selects a first icon in the first menu, the method further includes displaying a second screen having the image after automatic red eye removal and a second menu. If the user selects a second icon in the second menu, the method further includes redisplaying the second screen having the image prior to automatic red eye removal. If the user selects a third icon in the second menu, the method further includes displaying a third screen having the image, a visual indicator for the location of manual red eye removal, and a third menu. If the user selects a fourth icon in the third menu, the method further includes redisplaying the second screen with the image after manual red eye removal.

DETAILED DESCRIPTION

Figure 1:
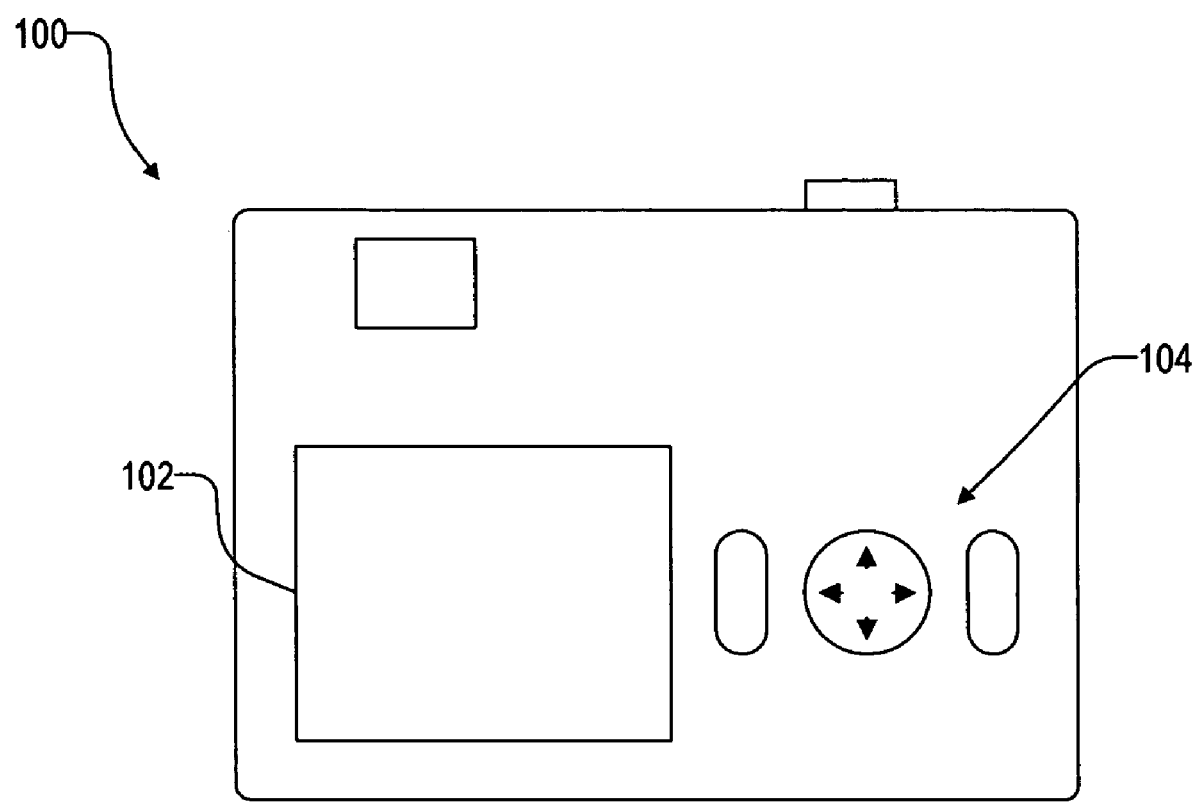
FIG. 1 illustrates a portable device in one embodiment of the invention.

FIG. 1 illustrates a portable device 100, such as digital camera or a cell phone equipped with a camera, in one embodiment of the invention. Device 100 has a display 102 and input buttons 104 used to interact with device 100.

Figure 2:
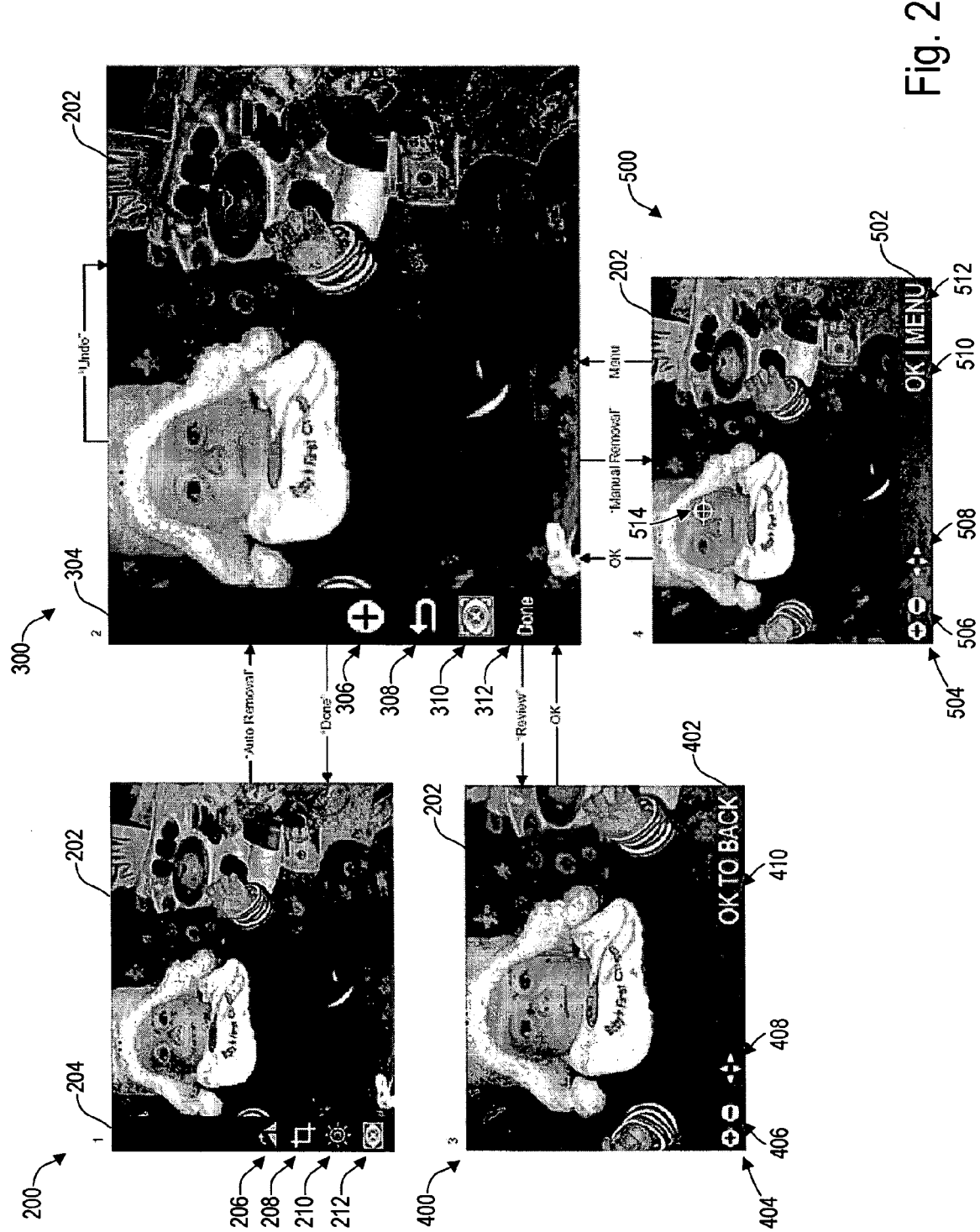
FIG. 2 illustrates screenshots of a user interface for red eye removal on the device of FIG. 1 in one embodiment of the invention.

FIG. 2 illustrates screenshots of a user interface for a red eye removal function of device 100 in one embodiment of the invention. After the user selects to edit an image, device 100 generates a screen 200 on display 102. Screen 200 includes an image 202 to be edited and a menu 204 having a set of icons. The icons include a rotate icon 206, a crop icon 208, an automatic contrast adjustment icon 210, and an automatic red eye removal icon 212. The user navigates a cursor, which can be visually indicated as a highlighted box around the icon, to select one of the icons using input buttons 104.

If the user selects automatic red eye removal icon 212, device 100 automatically attempts to locate and remove the red eye effect from image 202. This process may take a few seconds. Afterwards, device 100 generates a screen 300.

Screen 300 includes image 202 after the automatic red eye removal and a menu 304 having a set of icons. The icons include a review icon 306, an undo icon 308, a manual red eye removal icon 310, and a done icon 312. If the user selects review icon 306, device 100 generates a screen 400 (to be described). If the user selects undo icon 308, device 100 regenerates screen 300 but with original image 202 prior to automatic red eye removal. If the user selects manual red eye removal icon 310, device 100 generates a screen 500 (to be described). If the user selects done icon 312, device 100 saves any changes to image 202 and regenerates screen 200. Note that image 202 can be the original image or the original image after automatic red eye removal, manual red eye removal, or a combination of both automatic and manual red eye removal.

Screen 400 includes image 202 and a menu 402 having a set of icons. The icons include a zoom-in icon 404, a zoom-out icon 406, a panning icon 408, and a done icon 410. If the user selects zoom-in icon 404, device 100 regenerates screen 400 with a magnified image 202. If the user selects zoom-out icon 406, device 100 regenerates screen 400 with a reduced image 202. If the user selects panning icon 408, device 100 allows the user to pan through image 202 using input buttons 104. Instead of icons 404, 406, and 408, device 100 may have predefined buttons for performing these functions. If the user selects done icon 410, device 100 returns the user to screen 300. Once back in screen 300, the user can undo any automatic or manual red eye removal by selecting undo icon 308 if he or she so desires.

Screen 500 includes image 202 and a menu 502 having a set of icons. The icons include a zoom-in icon 504, a zoom-out icon 506, a panning icon 508, an OK icon 510, and a menu icon 512. If the user selects zoom-in icon 504, device 100 regenerates screen 500 with a magnified image 202. If the user selects zoom-out icon 506, device 100 regenerates screen 500 with a reduced image 202. If the user selects panning icon 508, device 100 allows the user to move a crosshair 514 over image 202 to identify a red eye to be removed. Instead of icons 504, 506, and 508, device 100 may have predefined buttons for performing these functions.

If the user selects OK icon 510, device 100 attempts to remove the red eye effect at the location identified by crosshair 514. This process may take a few seconds. Afterwards, device 100 regenerates screen 300 with image 202 after manual red eye removal. If the user selects menu icon 512, device 100 regenerates screen 300 with image 202 without manual red eye removal.

After the user manually corrects on red eye, the user can again select manual red eye removal icon 310 in screen 300 to correct additional red eyes in image 202.

Figure 3:
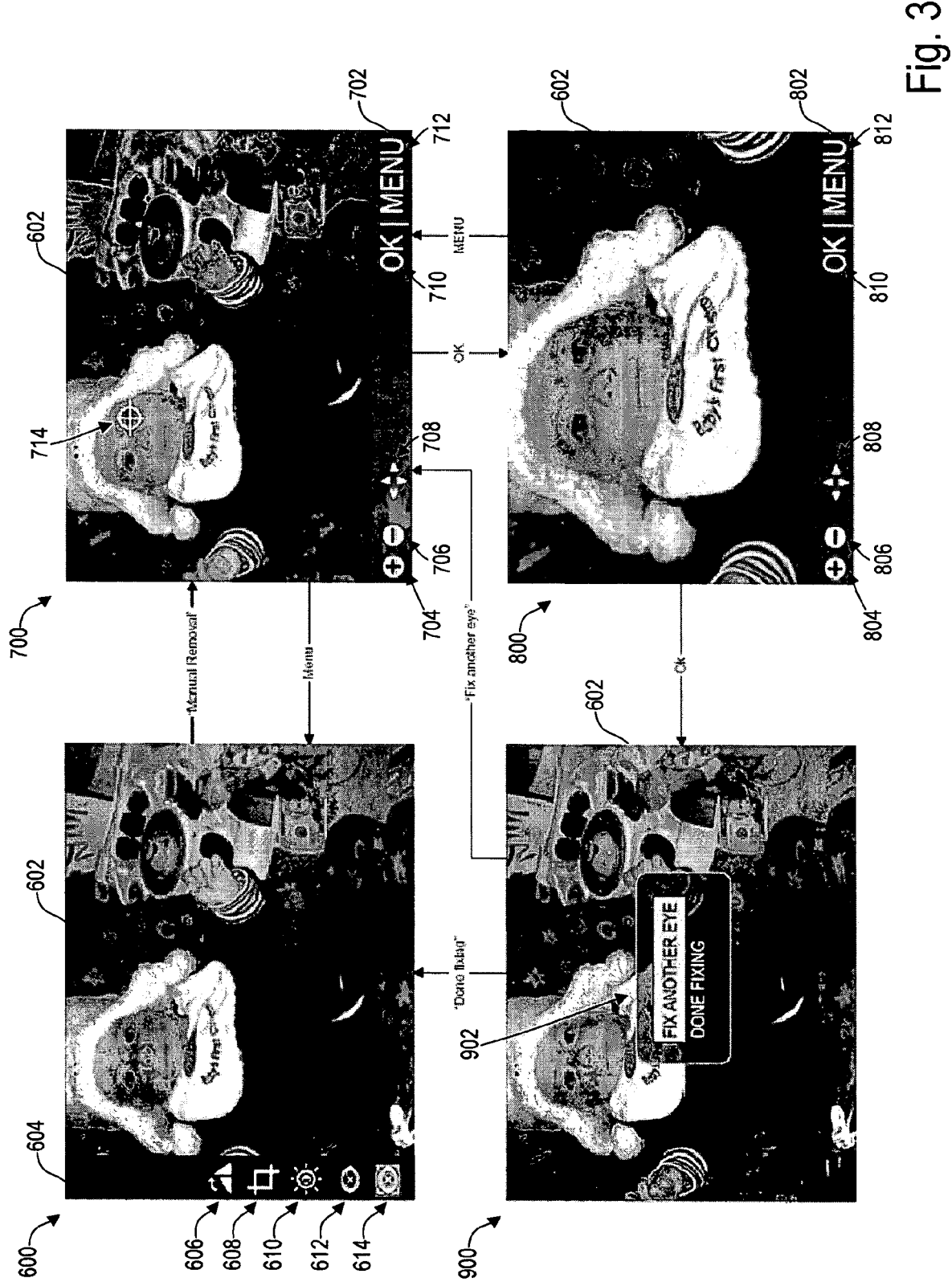
FIG. 3 illustrates screenshots of another user interface for red eye removal on the device of FIG. 1 in another embodiment of the invention.

FIG. 3 illustrates screenshots of another user interface for a red eye removal function of device 100 in one embodiment of the invention. After the user selects to edit an image, device 100 generates a screen 600 on display 102. Screen 600 includes an image 602 to be edited and a menu 604 having a set of icons. The icons include a rotate icon 606, a crop icon 608, an automatic contrast adjustment icon 610, an automatic red eye removal icon 612, and a manual red eye removal icon 614. The user navigates a cursor, which can be visually indicated as a highlighted box around the icon, to select one of the icons using input buttons 104.

If the user selects automatic red eye removal icon 612, device 100 automatically attempts to locate and remove the red eye effect from image 602. This process may take a few seconds. Afterwards, device 100 generates screen 300 as described above in reference to FIG. 2. In one embodiment, menu 304 in screen 300 does not include manual red eye removal icon 310 because menu 604 in screen 600 already includes manual red eye removal icon 614.

If the user selects manual red eye removal icon 614, device 100 generates a screen 700. Screen 700 includes image 602 and a menu 702 having a set of icons. The icons include a zoom-in icon 704, a zoom-out icon 706, a panning icon 708, an OK icon 710, and a menu icon 712. If the user selects zoom-in icon 704, device 100 regenerates screen 700 with a magnified image 602. If the user selects zoom-out icon 706, device 100 regenerates screen 700 with a reduced image 602. If the user selects panning icon 708, device 100 allows the user to move a crosshair 714 over image 602 to identify a red eye to be removed. Instead of icons 704, 706, and 708, device 100 may have predefined buttons for performing these functions.

If the user selects OK icon 710, device 100 attempts to remove the red eye effect at the location identified by crosshair 714. This process may take a few seconds. Afterwards, device 100 generates a screen 800 (described later). If the user selects menu icon 512, device 100 saves any changes to image 602 and regenerates screen 600.

Screen 800 includes image 602 after manual red eye removal, and a menu 802 having a set of icons. The icons include a zoom-in icon 804, a zoom-out icon 806, a panning icon 808, an OK icon 810, and a menu icon 812. If the user selects zoom-in icon 804, device 100 regenerates screen 800 with a magnified image 602. If the user selects zoom-out icon 806, device 100 regenerates screen 800 with a reduced image 602. If the user selects panning icon 808, device 100 allows the user to pan through image 602. Instead of icons 804, 806, and 808, device 100 may have predefined buttons for performing these functions.

If the user selects OK icon 810, device 100 generates a screen 900 (described later). If the user selects menu icon 812, device 100 regenerates screen 700 without saving the changes to image 602.

Screen 900 includes image 602 and a window 902. Window 902 prompts the user to select either to fix another red eye or finish the red eye removal process. The user can use input keys 104 to select one of the two options. If the user selects to fix another red eye, device 100 regenerates screen 700 with image 602 so that the user can fix another red eye. If the user selects to finish the red eye removal process, then device 100 saves the changes to mage 602 and regenerates screen 600.

Various other adaptations and combinations of features of the embodiments disclosed are within the scope of the invention. Numerous embodiments are encompassed by the following claims.

What is claimed is:

1. A method of a user interface for red eye removal in a portable device, comprising:
displaying a first screen comprising an image and a first menu, the first menu including a first icon for automatic red eye removal;
if a user selects the first icon:
displaying a second screen comprising the image after automatic red eye removal and a second menu, the second menu including a second icon for undoing automatic red eye removal, a third icon for manual red eye removal, a fourth icon for reviewing changes to the image, and a fifth icon for saving the image and redisplaying the first screen;
if the user selects the second icon, redisplaying the second screen with the image prior to automatic red eye removal;
if the user selects the third icon:
displaying a third screen comprising the image, a visual indicator over the image for manual red eye removal, and a third menu, the third menu including a sixth icon for accepting a placement of the visual indicator and initiating manual red eye removal;
if the user selects the sixth icon:
redisplaying the second screen with the image after manual red eye removal.

2. The method of claim 1, wherein the first menu farther includes a seventh icon for rotating the image, an eighth icon for cropping the image, and a ninth icon for adjusting contrast of the image.

3. The method of claim 1, further comprises:
if the user selects the fourth icon, displaying a fourth screen comprising the image after automatic red eye removal and a fourth menu, the fourth menu comprising a seventh icon for zooming-in the image, an eighth icon for zooming-out of the image, a ninth icon for panning the image, and a tenth icon for redisplaying the second screen.

4. The method of claim 1, wherein the visual indicator comprises a crosshair.

5. The method of claim 1, wherein the third menu further includes a seventh icon for zooming-in the image, an eighth icon for zooming-out of the image, a ninth icon for moving the visual indicator, and a tenth icon for redisplaying the second screen.

6. A method of a user interface for red eye removal in a portable device, comprising:
displaying a first screen comprising an image and a first menu, the first menu including a first icon for automatic red eye removal;
if a user selects the first icon:
displaying a second screen comprising the image after automatic red eye removal and a second menu, the second menu including a second icon for undoing automatic red eye removal and a third icon for manual red eye removal;
if the user selects the second icon, redisplaying the second screen with the image prior to automatic red eye removal;
if the user selects the third icon:
displaying a third screen comprising the image, a visual indicator over the image for manual red eye removal, and a third menu, the third menu including a fourth icon for accepting a placement of the visual indicator and initiating manual red eye removal, a fifth icon for zooming-in the image, a sixth icon for zooming-out of the image, a seventh icon for moving the visual indicator, and an eighth icon for redisplaying the second screen;
if the user selects the fourth icon:
redisplaying the second screen with the image after manual red eye removal.

7. The method of claim 6, wherein the first menu further includes a ninth icon for rotating the image, a tenth icon for cropping the image, and an eleventh icon for adjusting contrast of the image.

8. The method of claim 6, wherein the second menu further includes a ninth icon for reviewing changes to the image, the method further comprises:
   if the user selects the ninth icon, displaying a fourth screen comprising the image after automatic red eye removal and a fourth menu, the fourth menu comprising a tenth icon for zooming-in the image, an eleventh icon for zooming-out of the image, a twelve icon for panning the image, and a thirteen icon for redisplaying the second screen.

9. The method of claim 6, wherein the visual indicator comprises a crosshair.

10. A method of a user interface for red eye removal in a portable device, comprising:
   displaying a first screen comprising an image and a first menu, the first menu including a first icon for automatic red eye removal and a second icon for manual red eye removal;
   if a user selects the first icon:
      displaying a second screen comprising the image after automatic red eye removal and a second menu, the second menu including a third icon for saving the image and redisplaying the first screen;
   if the user selects the second icon:
      displaying a third screen comprising the image, a visual indicator over the image for manual red eye removal, and a third menu, the third menu including a fourth icon for accepting a placement of the visual indicator and initiating manual red eye removal;
   if the user selects the fourth icon:
      displaying a fourth screen with the image after manual red eye removal and a fourth menu, the fourth menu including a fifth icon for accepting changes to the image.

11. The method of claim 10, wherein the first menu further includes a sixth icon for rotating the image, a seventh icon for cropping the image, and an eighth icon for adjusting contrast of the image.

12. The method of claim 10, wherein the visual indicator comprises a crosshair.

13. The method of claim 10, wherein the third menu further includes a sixth icon for zooming-in the image, a seventh icon for zooming-out of the image, a eighth icon for moving the visual indicator, and a ninth icon for redisplaying the first screen.

14. The method of claim 10, further comprising:
   if the user selects the fifth icon:
      displaying a fifth screen comprising the image and a window prompting the user to fix another red eye or accept the changes to the image;
      if the user selects to fix another red eye, redisplaying the third screen with the image after manual red eye removal;
      if the user selects to accept the image, saving the image and redisplaying the first screen.

15. The method of claim 14, wherein the fourth menu further includes a sixth icon for zooming-in the image, a seventh icon for zooming-out of the image, an eighth icon for panning the image, and a ninth icon for redisplaying the third screen.

* * * * *

UNITED STATES PATENT AND TRADEMARK OFFICE
CERTIFICATE OF CORRECTION

PATENT NO. : 7,483,068 B2  Page 1 of 1
APPLICATION NO. : 11/008864
DATED : January 27, 2009
INVENTOR(S) : Bin Zhao and Kaixuan Mao It is certified that error appears in the above-identified patent and that said Letters Patent is hereby corrected as shown below:

Column 4, line 22, Claim 2: Cancel "farther" and substitute --further--.

Column 6, line 14, Claim 13: Cancel "a eighth" and substitute --an eighth--.

Signed and Sealed this

Twenty-first Day of July, 2009

JOHN DOLL
*Acting Director of the United States Patent and Trademark Office*